United States Patent
Buchwald et al.

(10) Patent No.: US 10,382,905 B1
(45) Date of Patent: Aug. 13, 2019

(54) METHOD AND CONTROLLER TO PROVIDE LARGE GROUP DATA CALLS WHILE REDUCING GROUP ECHO

(71) Applicant: MOTOROLA SOLUTIONS, INC, Chicago, IL (US)

(72) Inventors: Gregory J. Buchwald, Crystal Lake, IL (US); Thomas B. Bohn, McHenry, IL (US); Arthur Christopher Leyh, Spring Grove, IL (US); David P Gurney, Carpentersville, IL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 0 days.

(21) Appl. No.: 16/227,625

(22) Filed: Dec. 20, 2018

(51) Int. Cl.
*H04W 4/10* (2009.01)
*H04W 4/021* (2018.01)
*H04W 4/08* (2009.01)
*H04W 84/04* (2009.01)

(52) U.S. Cl.
CPC ............. *H04W 4/10* (2013.01); *H04W 4/021* (2013.01); *H04W 4/08* (2013.01); *H04W 84/042* (2013.01)

(58) Field of Classification Search
CPC ......... H04W 4/021; H04W 4/08; H04W 4/10; H04W 84/042; H04W 84/08
See application file for complete search history.

(56) References Cited

U.S. PATENT DOCUMENTS

2014/0304711 A1* 10/2014 Tennant .................... G06F 9/50
                                                          718/104
2017/0339614 A1    11/2017 Kim et al.

FOREIGN PATENT DOCUMENTS

WO        2013090317 A1    6/2013

* cited by examiner

*Primary Examiner* — Raymond S Dean

(57) ABSTRACT

A method and server provide for routing traffic to user equipment in a talkgroup. The server receives a request for a new talkgroup call for a talkgroup. The server determines a total number of device targets for the talkgroup call. When the total number of device targets for the new talkgroup call is greater than a predetermined total target threshold number, a call grant for the new talkgroup call is routed to each device target for the talkgroup via a Land Mobile Radio (LMR) network. When the total number of device targets for the new talkgroup call is less than the predetermined total target threshold number, the call grant for the new talkgroup call is routed to each device target for the talkgroup via a preferred network for each device target.

20 Claims, 3 Drawing Sheets

METHOD AND CONTROLLER TO PROVIDE LARGE GROUP DATA CALLS WHILE REDUCING GROUP ECHO

BACKGROUND OF THE INVENTION

Public safety communication systems and private/commercial land mobile systems deliver both data and voice to their subscribers. Such public safety communication and private land mobile communications systems can utilize various technologies to deliver the data and voice. In general, narrowband radio links are utilized for this purpose. More recently, Public Safety systems often utilize broadband methods to deliver increasing content at faster rates. Examples of such technologies include Land Mobile Radio (LMR) systems, Citizens Broadband Radio Service (CBRS), and Long Term Evolution (LTE) cellular systems.

Subscribers utilize mobile devices to send and receive data over these communication systems. Mobile devices can be less useful when they are only allowed to access one of the various over the air technologies, such as LMR, CBRS, or LTE. To solve this problem, mobile devices have been manufactured and programmed to have the ability to access multiple technologies. For example, mobile devices exist to that can utilize both LMR and LTE systems, thereby making the mobile devices more useful, more fault tolerant, and having increased geographic scope.

A talkgroup call is a push to talk (PTT) communication including all members who are registered with a talkgroup. One problem with such dual-mode devices is that they can experience what is called "the lunchroom effect" during talkgroup calls. In LMR systems, a user depresses a button on a mobile device, and the audio provided by that user is transmitted to all other talkgroup members In a narrowband system, this is typically done by directing all talkgroup callers to a base station that is carrying the talkgroup call over a single radio frequency channel. The resultant transmission is directed to all recipients in broadcast mode; all listeners to the message receive it simultaneously. So if multiple subscribers, such as public safety officers, are in the same location, they will all be receiving the same radio signal over the same frequency at the same time, thereby alleviating issues of multiple, diverse delayed reception to each subscriber. Such delayed reception of individual audio streams would result in multiple streams exhibiting random delayed audio output from the broadcast subscriber device, thereby causing significant disruption and distraction to the group of users if they are co-located. In the single channel, broadcast condition mode, they will all be receiving and playing the audio on their mobile devices at virtually the same time. The effect at the multi-user reception site is similar to having multiple devices listening to a single FM radio station.

However, dual-mode device may receive the talkgroup call and corresponding audio on an LTE or other unicast, broadband channel. In a unicast system, each subscriber, therefore each recipient, receives audio through a separate effective virtual channel. This LTE channel would be dedicated to this receiving talkgroup mobile device. When a single device is located in a particular location, the user will hear the audio, and if the audio is delayed for a small amount of time there is no deleterious effect.

However, if multiple talkgroup members are located in the same location and are all in LTE mode, each will be receiving the talkgroup audio on a different channel. Because each channel will have different amounts of delay, each device will receive the audio at a different time. As more and more dual-mode subscribers are located in a single location and using LTE to receive the talkgroup audio, the delay in audio on each device will lead to the audio being played at different times. This will make the audio very difficult to understand, and will quickly annoy all users ate the location, as "the lunchroom effect" has audio playing at slightly different times.

Therefore a need exists for a way of allowing dual-mode or multi-mode mobile devices to participate in talkgroup calls without playing audio at a different timing as other talkgroup users located at the same location.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
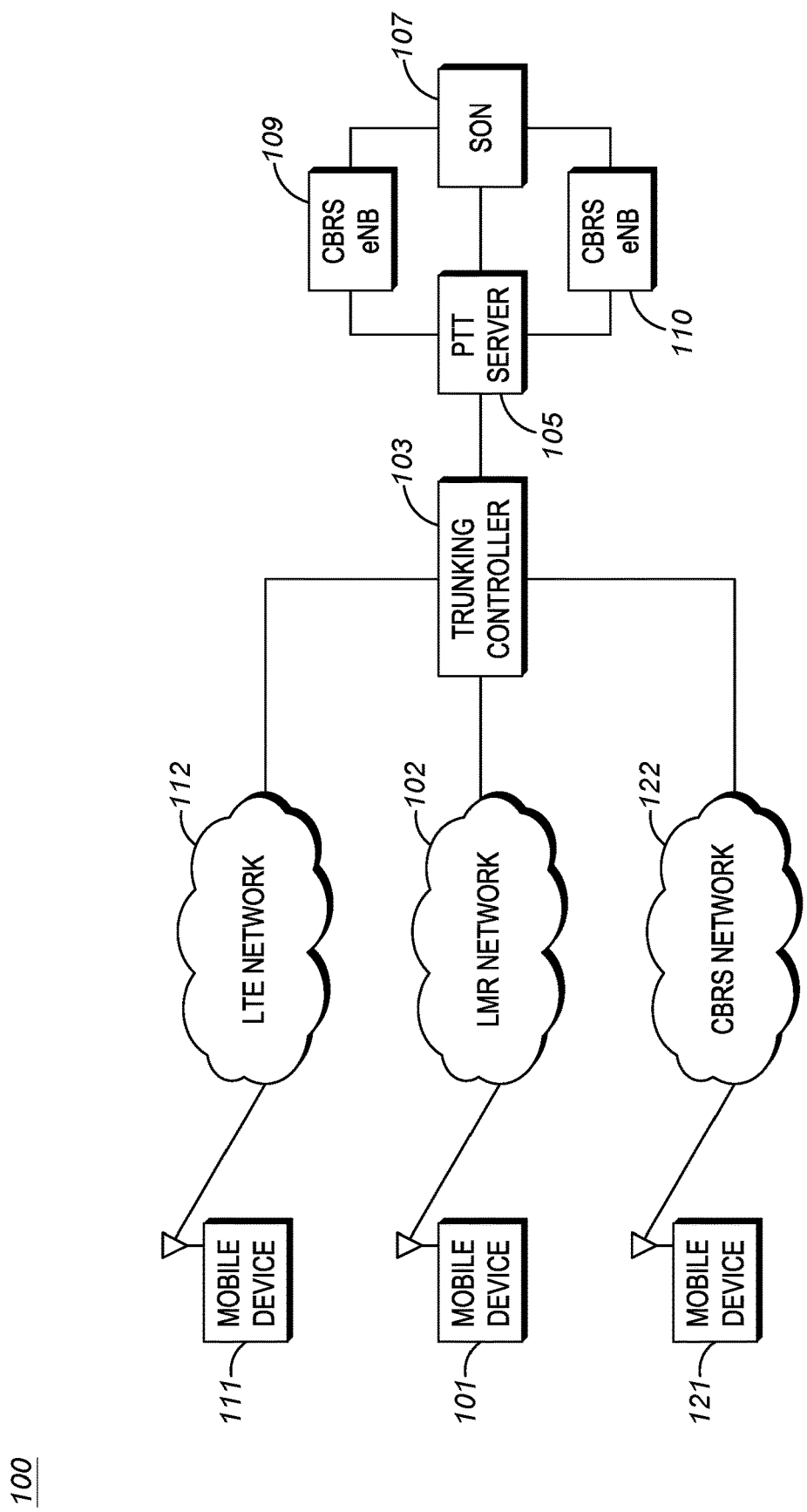
FIG. 1 depicts a system diagram of a communication system in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

The embodiments illustrated herein provide a means for the system to allow individual calls to be transported over the unicast channel; usually an LTE or similar broadband system. When units are found to be in close proximity and a group call is initiated to broadcast the message to multiple users, the system will determine, based on multiple inputs, the correct method to transmit the audio or data signaling to each user as to minimize or eliminate the confusion of delayed response to several users within the same physical space.

An exemplary embodiment provides a method and server that include routing logic to route talkgroup traffic to and from LTE/LMR converged or collaborative mobile devices depending on the target talkgroup size. In accordance with an exemplary embodiment, all bandwidth-demanding services and private voice calls are handled by the CBRS eNB and the CBRS devices, whether the mobile devices are separate or converged. This reduces the bandwidth demands during large group calls.

In accordance with an exemplary embodiment, all large group calls above some predetermined threshold are detected at a Broadband Voice Stack, and in collaboration with an LMR controller are pushed to the LMR infrastructure and LMR devices wherever necessary or desirable. This frees LTE/CBRS bandwidth and mobile device connections for data applications. It also guarantees that all hands on deck calls and emergency calls get through with little differential delay, regardless of the available broadband capacity. In addition, this eliminates echoing among co-located listening devices, sometimes referred to as "the lunchroom effect."

FIG. 1 depicts a system diagram of a communication system 100 in accordance with an exemplary embodiment of the present invention. Communication system 100 preferably includes mobile devices 101, 111, and 121, a Land Mobile Radio (LMR) communication network 102, an LTE communication network 112, a CBRS Network 122, a trunking controller 103, a PTT Server 105, Self Optimizing Network (SON) 107, and CBRS eNBs 109 and 110.

Mobile devices 101, 111, and 121 are operably connected to LMR Network 102, LTE Network 112, and CBRS Network 122, respectively. Mobile devices 101, 111, and 121 are preferably mobile units that can make and receive calls over a radio frequency link while the user is moving within any telephony service area served by an associated network or any associated networks. Mobile devices 101, 111, and 121 can alternately be any communication devices that can communicate with a network and provide or receive information from a network.

In accordance with an exemplary embodiment, mobile device 101 is a multi-mode device, such as a dual-mode device, that can communicate with LMR Network 102 and LTE Network 112 and CBRS network 122, as LTE Network is a fallback for users on CBRS network 122. In FIG. 1, mobile device 101 is communicating with LMR Network 102.

In accordance with an exemplary embodiment, mobile device 111 is a multi-mode device, such as a dual-mode device, that can communicate with LMR Network 102 and LTE Network 112 and CBRS network 122, as LTE Network is a fallback for users on CBRS network 122. In FIG. 1, mobile device 111 is communicating with LTE Network 112.

In accordance with an exemplary embodiment, mobile device 121 is a multi-mode device, such as a dual-mode device, that can communicate with LMR Network 102 and CBRS Network 122 and CBRS network 122, as LTE Network is a fallback for users on CBRS network 122. In FIG. 1, mobile device 121 is communicating with CBRS Network 122.

In accordance with an exemplary embodiment, mobile devices 101, 111, and 121 are members of the same talkgroup. In some embodiments, communication system 100 includes more or fewer communication devices and more or fewer talkgroups. In some embodiments, the talkgroups have more or fewer affiliated communication devices. In some embodiments, the talkgroups do not have the same number of affiliated communication devices. While FIG. 1 illustrates three communication devices 101, 111, and 121 for clarity purposes, it should be understood that the methods herein can be used with more or fewer communication devices.

Mobile devices 101, 111, and 121 are preferably converged devices, which can access both LTE/CBRS networks in addition to LMR networks. Alternately, mobile devices 101, 111, and 121 can be collaborative devices, where each is a separate device, for example one being an LMR device and the other being a CBRS device, but where the two devices are connected in a collaborative manner to form a collaborative device. Further, mobile devices 101, 111, and 121 can be a mixed device set of users, for example one public safety officer in a car on an LMR network and a second public safety officers on an LTE/CBRS system.

LMR communication network 102 is a person-to-person voice communication system consisting of two-way radio transceivers which can be mobile, installed in vehicles, or portable. LMR communication networks are widely used by public safety and first responder organizations such as police, fire, and ambulance services, and other governmental organizations. LMR communication network 102 can alternately be designed for private commercial use. Most LMR communication networks are half-duplex, with multiple mobile devices sharing a single radio channel, so only one mobile device can transmit at a time. The mobile device is normally in receiving mode so the user can hear other radios on the channel. When a user wants to talk, for example in a talkgroup call, the user presses a push to talk button on his mobile device, which turns on the transmitter of the mobile device. LMR communication network 102 preferably includes dispatch consoles, data applications, and RF conventional or trunked sites.

LTE communication network 112 is a cellular network that supports packet switching over an-IP network. LTE communication network 112 preferably includes System Architecture Evolution (SAE), which includes an Evolved Packet Core (EPC) network. Together LTE and SAE comprise the Evolved Packet System (EPS). An LTE communication network 112 also preferably comprises an eNodeB (evolved node B), a MME (Mobile Management Entity), an HSS (Home Subscriber Server), an SGW (Serving GateWay), and a PGW (Packet data network GateWay).

CBRS Network 122 is a three-tiered spectrum service that allows a variety of commercial uses on a shared basis. Users do not require spectrum licenses. CBRS equipment is preferably deployed to individual building owners, and those owners pay a fee for spectrum allocation through a server, CBRS Network 122 preferably includes a plurality of CBRS eNodeBs, although only two, CBRS eNB 109 and 110, are depicted in FIG. 1 for clarity. CBRS Network 122 also includes other network elements, such as a Spectrum Allocation Server (SAS), but they are not depicted in FIG. 1 for clarity.

Trunking controller 103 is operably coupled to LMR communication network 102, LTE communication network 112, CBRS Network 122, and PTT Server 105. Trunking controller 103 receives requests for talkgroup calls and processes the requests. Trunking controller 103 sends a digital signal to all members of the requested talkgroup instructing the members to switch to the frequency indicated to monitor the talkgroup transmission. Trunking controller 103 is depicted in more detail in FIG. 2 below.

PTT Server 105 is operably coupled to Trunking Controller 103, Self Optimizing Network (SON) 107, and CBRS eNBs 109 and 110. PTT Server 105 controls push to talk functionality within communication system 100.

SON 107 is a self-organizing network that assists in planning, configuring, managing, ad optimizing mobile networks. SON functionality has been standardized by 3GPP (3rd Generation Partnership Project) and the NGMN (Next Generation Mobile Networks). SON 107 has been incorporated by LTE in such features as Automatic Neighbor Relation (ANR) detection.

CBRS eNBs 109 and 110 are operably coupled with PTT Server 105 and SON 107. CBRS eNBs 109 and 110 include hardware that communicates directly via wireless with mobile units that are a part of the CNRS network.

Figure 2:
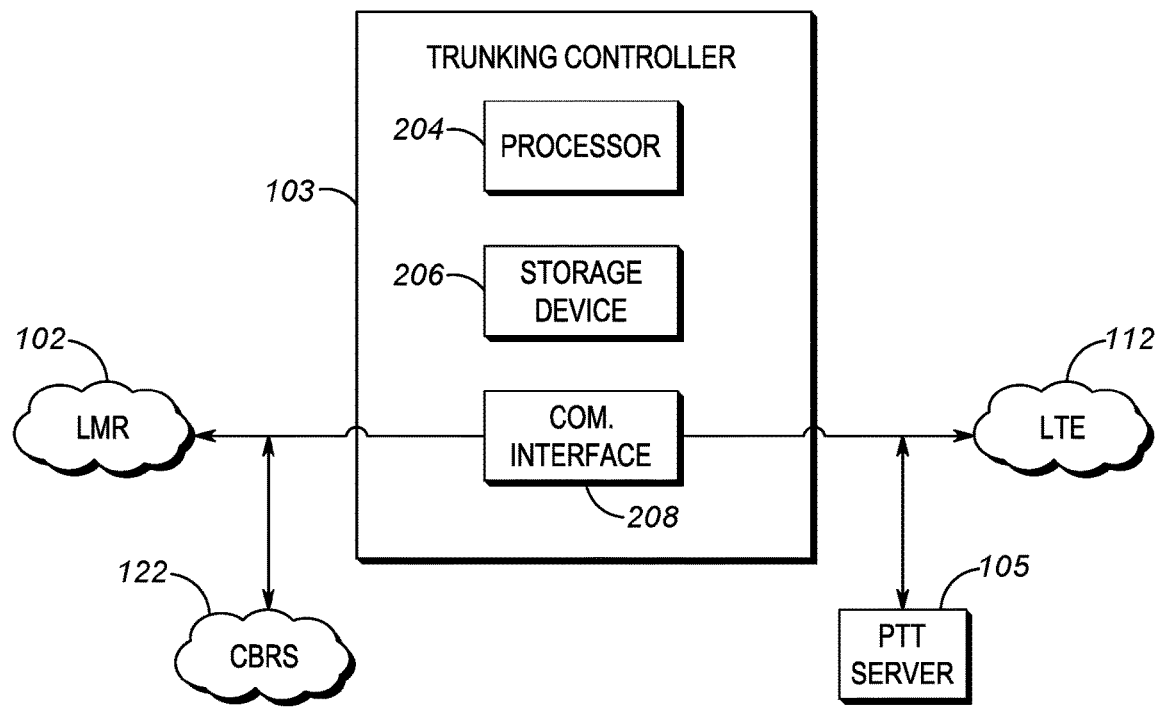
FIG. 2 depicts a schematic of a trunking controller in accordance with an exemplary embodiment of the present invention.

FIG. 2 schematically illustrates trunking controller 103 in more detail. In the example provided, trunking controller 103 includes an electronic processor 204, a storage device 206, and a communication interface 208. Electronic processor 204, storage device 206, and communication interface 208 communicate over one or more communication lines or buses. Wireless connections or a combination of wired and wireless connections are also possible.

Electronic processor 204 may include a microprocessor, application-specific integrated circuit (ASIC), field-programmable gate array, or another suitable electronic device. Electronic processor 204 obtains and provides information (for example, from storage device 206 and/or communication interface 208), and processes the information by executing one or more software instructions or modules, capable of being stored, for example, in a random access memory ("RAM") area of storage device 206 or a read only memory ("ROM") of storage device 206 or another non-transitory computer readable medium (not shown). The software can include firmware, one or more applications, program data, filters, rules, one or more program modules, and other executable instructions. Electronic processor 204 is configured to retrieve from storage device 206 and execute, among other things, software related to the control processes and methods described herein.

Storage device 206 can include one or more non-transitory computer-readable media, and may include a program storage area and a data storage area. The program storage area and the data storage area can include combinations of different types of memory, as described herein. In the embodiment illustrated, storage device 206 stores, among other things, instructions for the processor to carry out the method of FIG. 3.

Communication interface 208 may include a transceiver (for example, an LTE modem, an FM transceiver, or a Wi-Fi or Ethernet transceiver) for communicating over one or more wired or wireless communication networks, such as LMR Network 102, LTE Network 112, CBRS Network 122, and PTT Server 105.

Figure 3:
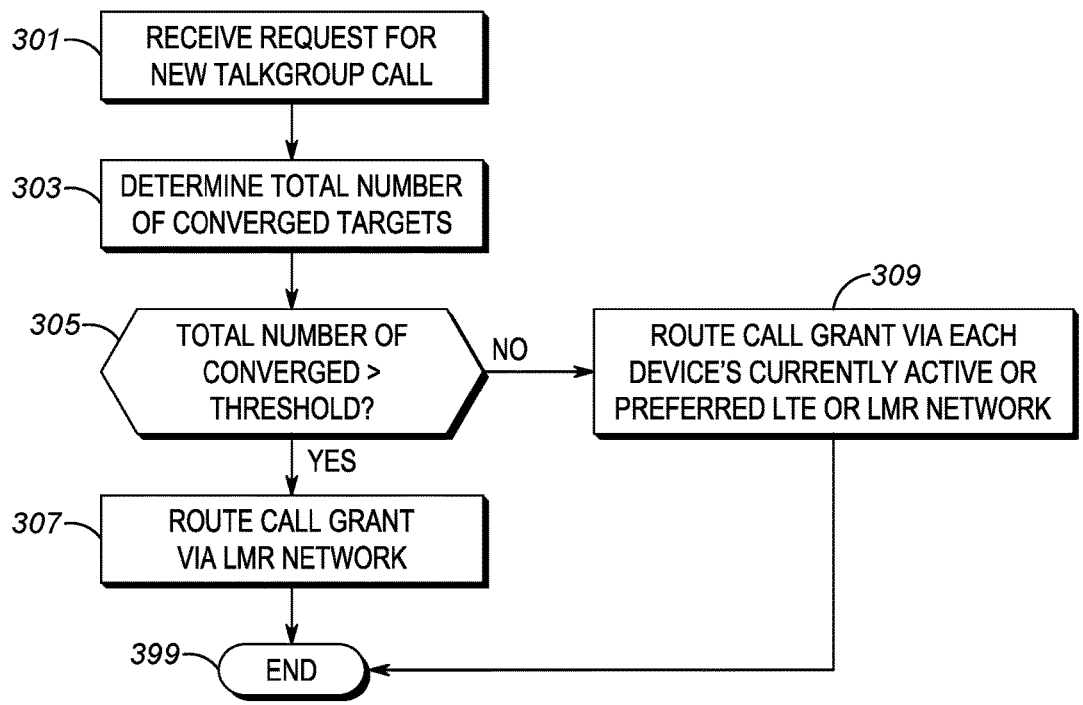
FIG. 3 depicts a flowchart in accordance with an exemplary embodiment of the present invention.

FIG. 3 depicts a flowchart 300 in accordance with an exemplary embodiment of the present invention. In accordance with the exemplary embodiment depicted in FIG. 3, trunking controller 103, which can be a broadband voice stack processor application server, which is communicably coupled to an LMR controller, includes routing logic for determining how to route traffic to and/or from an LTE/LMR converged or collaborative network type user equipment in a single talkgroup. FIG. 3 depicts an LTE/LMR converged device, but the device could be an LTE/LMR collaborative device.

Trunking controller 103 receives (301) a request for a new talkgroup call. The talkgroup call request can be received from a broadband user equipment portion of an LTE/LMR converged or collaborative device or from an LMR user equipment portion of an LTE/LMR converged or collaborative device, The talkgroup call request is preferably received via the LMR controller.

Trunking controller 103 and/or PTT server 105 determine (303) a total number of LTE/LMR converged device targets for the talkgroup call. This determination is preferably independent of which network interface is currently active or preferred.

Trunking controller 103 and/or PTT server determines (305) if the total number of LTE/LMR converged or collaborative device targets for the talkgroup call within the network is greater than a predetermined total target threshold number. This frees broadband system resources and capacity for broadband applications for use by users not affiliated with the target talk group.

Additionally, trunking controller 103 and/or PTT server determines (305) if the total number of LTE/LMR converged or collaborative device targets is above a predetermined threshold at a given physical location. In accordance with an exemplary embodiment, the predetermined total target threshold number is set to ten, but any number that would provide too much echo for users in the same location could be used.

When the total number of LTE/LMR converged device targets is greater than the predetermined total target threshold number, the talkgroup call grant is routed via LMR Network 102. In this manner, the group of talkgroup users who are collocated will hear the audio from the talkgroup call virtually simultaneously, and therefore the problems associated with audio from multiple devices that is not synced, i.e., "the lunchroom effect", will not occur.

When the total number of LTE/LMR converged device targets is not greater than the predetermined total target threshold number, the talkgroup call grant is routed via the currently active LTE or LMR network of each user. Alternately, the talkgroup call could be routed via a preferred network of a mobile device, for example if the mobile device is currently operating on a network that is not the preferred network for that mobile device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for routing traffic to user equipment in a talkgroup, the method comprising:
  receiving a request for a new talkgroup call for a talkgroup;
  determining a total number of device targets for the talkgroup call;
  when the total number of device targets for the new talkgroup call is greater than a predetermined total target threshold number, routing a call grant for the new talkgroup call to each device target for the talkgroup via a Land Mobile Radio (LMR) network; and
  when the total number of device targets for the new talkgroup call is less than the predetermined total target threshold number, routing the call grant for the new talkgroup call to each device target for the talkgroup via a preferred network for each device target.

2. The method of claim 1, wherein the step of receiving a request for a new talkgroup call comprises receiving the request for a new talkgroup call via an LMR controller.

3. The method of claim 1, wherein the step of determining a total number of device targets for the talkgroup call comprises determining a total number of Long Term Evolution (LTE)/LMR converged device targets for the talkgroup call.

4. The method of claim 3, wherein the step of determining a total number of LTE/LMR converged device targets for the talkgroup call comprises determining a total number of LTE/LMR converged device targets for the talkgroup call independent of which network interface is currently active.

5. The method of claim 3, wherein the step of determining a total number of LTE/LMR converged device targets for the talkgroup call comprises determining a total number of LTE/LMR converged device targets for the talkgroup call independent of which network interface is currently preferred.

6. The method of claim 3, wherein the step of determining a total number of LTE/LMR converged device targets for the talkgroup call comprises determining a total number of LTE/LMR converged device targets for the talkgroup call within a predetermined geographic area.

7. The method of claim 6, wherein the step of determining a total number of LTE/LMR converged device targets for the talkgroup call within a predetermined geographic area comprises determining a total number of LTE/LMR converged device targets for the talkgroup call within a predetermined geographic area as determined by location reporting from each device target.

8. The method of claim 3, wherein the step of determining a total number of LTE/LMR converged device targets for the talkgroup call comprises determining at least one of the LTE/LMR converged device targets operating on a Citizens Broadband Radio Service (CBRS) band.

9. The method of claim 3, wherein the step of determining a total number of LTE/LMR converged device targets for the talkgroup call comprises determining at least one of the LTE/LMR converged device targets operating on a band 13 LTE band.

10. The method of claim 1, wherein determining when the total number of device targets for the new talkgroup call is greater than a predetermined total target threshold number comprises determining when the total number of device targets in the LMR network and the preferred network for each device target for the new talkgroup call is greater than a predetermined total target threshold number.

11. The method of claim 1, wherein determining when the total number of device targets for the new talkgroup call is greater than a predetermined total target threshold number comprises determining when the total number of device targets in a specific location for the new talkgroup call is greater than a predetermined total target threshold number.

12. The method of claim 11, wherein the specific location comprises a location within a pre-determined radius surrounding a chosen target subscriber device location.

13. A trunking controller comprising:
a communication interface; and
a processor that performs:
- receiving a request for a new talkgroup call for a talkgroup;
- determining a total number of device targets for the talkgroup call;
- when the total number of device targets for the new talkgroup call is greater than a predetermined total target threshold number, routing a call grant for the new talkgroup call to each device target for the talkgroup via a Land Mobile Radio (LMR) network; and
- when the total number of device targets for the new talkgroup call is less than the predetermined total target threshold number, routing the call grant for the new talkgroup call to each device target for the talkgroup via a preferred network for each device target.

14. The trunking controller of claim 13, wherein the processor performs the step of determining a total number of device targets for the talkgroup call by determining a total number of Long Term Evolution (LTE)/LMR converged device targets for the talkgroup call.

15. The trunking controller of claim 14, wherein the processor performs the step of determining a total number of LTE/LMR converged device targets for the talkgroup call by determining a total number of LTE/LMR converged device targets for the talkgroup call independent of which network interface is currently active.

16. The trunking controller of claim 14, wherein the processor performs the step of determining a total number of LTE/LMR converged device targets for the talkgroup call by determining a total number of LTE/LMR converged device targets for the talkgroup call independent of which network interface is currently preferred.

17. The trunking controller of claim 14, wherein the processor performs the step of determining a total number of LTE/LMR converged device targets for the talkgroup call by determining a total number of LTE/LMR converged device targets for the talkgroup call within a predetermined geographic area.

18. The trunking controller of claim 17, wherein the processor performs the step of determining a total number of LTE/LMR converged device targets for the talkgroup call within a predetermined geographic area by determining a total number of LTE/LMR converged device targets for the talkgroup call within a predetermined geographic area as determined by location reporting from each device target.

19. The trunking controller of claim 14, wherein the processor performs the step of determining a total number of LTE/LMR converged device targets for the talkgroup call by determining at least one of the LTE/LMR converged device targets operating on a Citizens Broadband Radio Service (CBRS) band.

20. The trunking controller of claim 13, wherein the processor performs the step of determining when the total number of device targets for the new talkgroup call is greater than a predetermined total target threshold number by determining when the total number of device targets in the LMR network and the preferred network for each device target for the new talkgroup call is greater than a predetermined total target threshold number.

* * * * *